Feb. 23, 1926.
C. F. OGREN
1,574,683
MOLD
Filed June 23, 1924
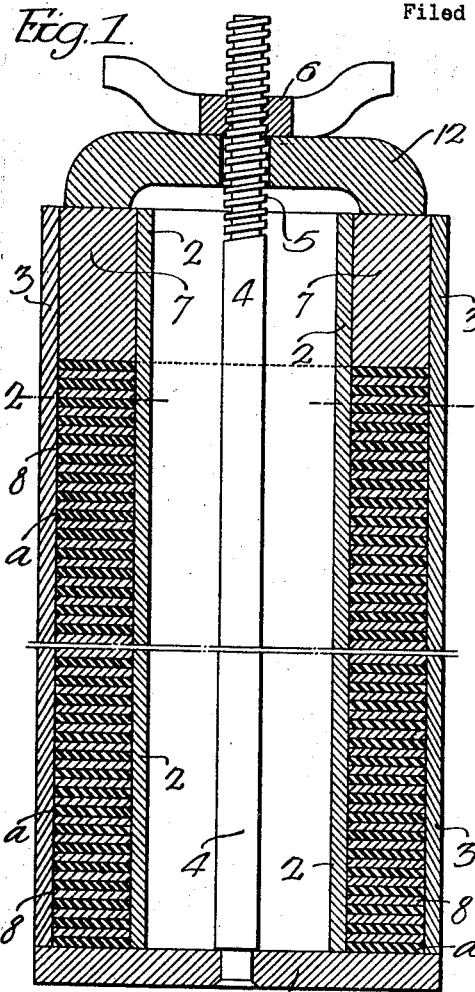
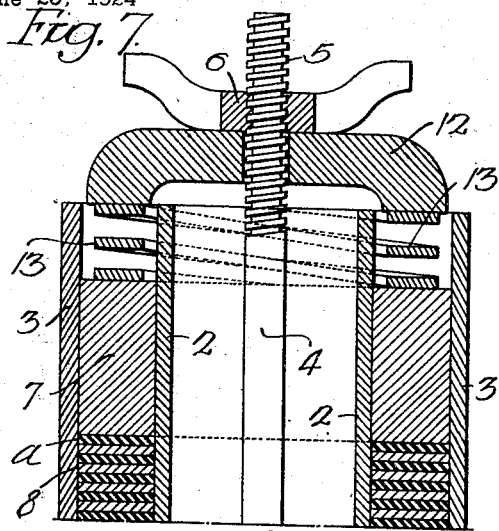
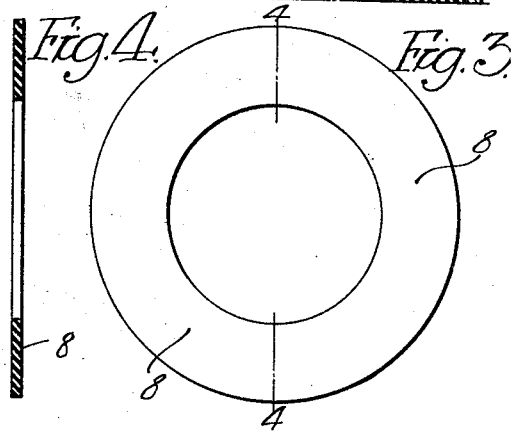
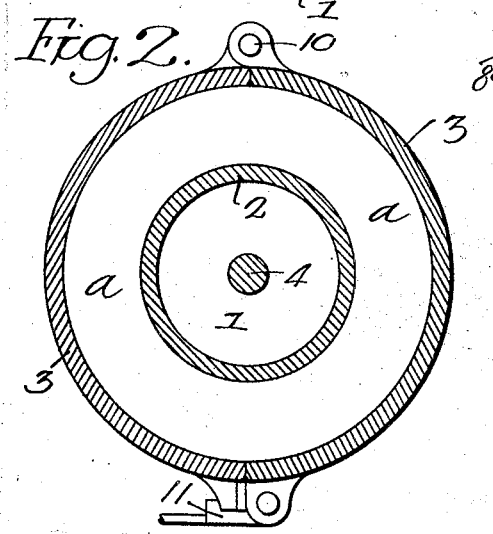
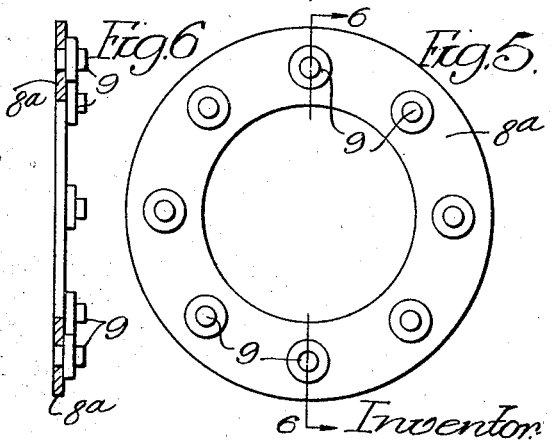
Inventor
Carl F. Ogren
by his Attorneys Patented Feb. 23, 1926.

1,574,683

UNITED STATES PATENT OFFICE.

CARL F. OGREN, OF TRENTON, NEW JERSEY, ASSIGNOR TO THERMOID RUBBER COMPANY, OF HAMILTON TOWNSHIP, NEW JERSEY, A CORPORATION OF NEW JERSEY.

MOLD.

Application filed June 23, 1924. Serial No. 721,811.

*To all whom it may concern:*

Be it known that I, CARL F. OGREN, a citizen of the United States, residing in Trenton, Mercer County, New Jersey, have invented certain Improvements in Molds, of which the following is a specification.

One object of my invention is to construct a mold for use in the manufacture of thin parts when application of pressure is required, and, in some instances, where heat is required to set, or vulcanize, the material.

A further object of the invention is to make the mold so that a number of parts can be clamped in the mold and subjected to pressure and heat.

In the accompanying drawings:

Fig. 1 is a longitudinal sectional view of my improved mold;

Fig. 2 is a transverse sectional view on the line 2—2, Fig. 1;

Fig. 3 is a detached view of one of the separation plates;

Fig. 4 is a sectional view on the line 4—4, Fig. 3;

Fig. 5 is a view of a separation plate having inserts thereon;

Fig. 6 is a sectional view on the line 6—6, Fig. 5; and,

Fig. 7 is a view illustrating a spring between the compression ring and compression plate.

The bottom plate 1 of the mold is of a size to allow the inner shell 2 and the outer shell 3 to rest upon it, as shown in Fig. 1.

Secured to the bottom plate 1, in any suitable manner, is a rod 4, having a screw thread 5 at its upper end. On the threaded portion 5 of the rod is a wing nut 6.

In the space between the inner and outer shells is a compression ring 7 and between this ring and the nut 6 is a compression plate 12.

The articles *a*, which are to be molded into shape, are placed in the space between the outer and inner shells and are separated by dividing plates or washers 8, Figs. 4 and 5. The plates 8 may be plain sheets of metal, or may have any surface irregularity necessary to form impressions in the parts being molded. In Figs. 5 and 6, the plates are in the form of flat rings 8ª, which are perforated to receive inserts 9. These inserts can be of any form desired.

The outer shell 2 is preferably made in two parts, as shown. The parts are connected by a hinge joint 10 at one side and are provided with catches 11, or other fastenings, at the opposite side.

In some instances, a spring 13 is located between the compression plate 12 and the compression ring 7 to give a definite pressure against the articles being molded.

The inner shell 2 controls the inner diameter of the rings or cylindrical pieces being molded. The outer shell 3 controls the outside diameter of the pieces. In some instances, the outer shell is dispensed with, where it is unnecessary to confine the periphery of the articles being molded in a given space.

In charging the mold, the two shells are located on the bottom plate. The pieces *a* to be molded are placed in the space between the outer and inner shells and are spaced apart by the dividing plates 8. Then the compression ring 12 is located on the plate 7, as shown in Fig. 1, and the wing nut 6 is turned on the screw rod, causing the plate 12 to force the ring 7 into the space between the shells and to compress the material to the required degree, after which the mold is heated in the ordinary manner, if heat is required.

The material from which the articles are formed is fibre or fabric, mixed with a suitable binder. It will be understood that any suitable material, which is capable of being molded, may be formed in the improved mold.

I claim:

1. The combination in a mold, of a bottom plate; a shell; a rod secured to the bottom plate and extending through the shell; a series of rings encircling the shell between which the materials to be molded are placed; a clamping plate; and a nut on the rod engaging the clamping plate.

2. The combination in a mold, of a bottom plate; a shell; a rod secured to the bottom plate and extending through the shell; a series of rings encircling the shell between which the materials to be molded are placed; a compression ring; a compression plate; a spring located between the ring and plate; and a nut on the rod engaging the compression plate.

3. The combination in a mold, of a bottom plate; inner and outer shells mounted on the plate; a rod secured to the bottom plate and extending through the inner shell;

a clamp plate shaped to extend into the space between the two shells; and a nut on the rod engaging the clamp plate.

4. The combination in a mold, of a bottom plate; inner and outer shells mounted on the bottom plate; a threaded rod secured to the bottom plate and extending through the inner shell; a series of spacing rings located in the space between the two shells; a compression ring, also in said space; a compression plate resting on the compression ring; and a nut engaging the said compression plate.

CARL F. OGREN.